United States Patent Office 3,408,326
Patented Oct. 29, 1968

3,408,326
NOVEL COPOLYMERS OF POLYFUNC-
TIONAL AMINES AND A BIS - AN-
THRANYL COMPOUND
Louis A. Errede, Roseville, Minn., assignor to Minnesota
Mining and Manufacturing Company, St. Paul, Minn.,
a corporation of Delaware
No Drawing. Filed June 27, 1963, Ser. No. 290,913
14 Claims. (Cl. 260—47)

ABSTRACT OF THE DISCLOSURE

Resinous materials suitable for use as protective coatings are prepared by reacting a polyfunctional amine containing a plurality of active amine-attached hydrogen atoms with a bis-anthranyl compound to yield polymers containing quinazolone rings of the formula

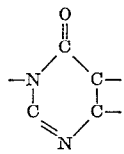

For example, representative copolymers are prepared by reacting methylene-bis-acetylanthranyl with hexamethylene diamine or 4,4'-diaminodiphenylether.

This invention relates to copolymeric compositions and more particularly to copolymers of polyfunctional amines with certain polyfunctional anthranyl compounds.

It is an object of the present invention to provide a new and useful class of copolymeric resins. It is another object of the invention to provide a novel and useful class of polymeric films. It is still another object of the present invention to provide a novel and useful class of protective coatings. Additional objects will be apparent to those skilled in the art from reading the specification which follows.

In accordance with the above and other objects of the invention it has been found that when certain polyfunctional amines are copolymerized with the hereinafter defined polymunctional anthranyl compounds, new resinous or elastomeric compositions are produced which have highly advantageous properties.

The polyfunctional anthranyl compounds employed in the copolymers of the invention have the formula:

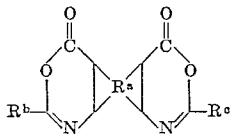

wherein $R^a$ is selected from the class consisting of:

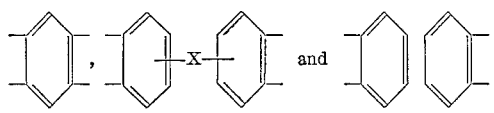

$R^b$ and $R^c$ are each hydrogen, aryl groups containing up to about fourteen carbon atoms, alkyl groups containing up to about eighteen carbon atoms or perfluoroalkyl groups containing up to about twelve carbon atoms and $R^b$ and $R^c$ when taken together are Y; X is a carbon-carbon single bond, —O—, —SO$_2$— or a straight or branched alkylene chain containing 1–18 carbon atoms; and Y is a carbon-carbon single bond, an alkylene group containing up to about 18 carbon atoms, an arylene group containing up to about 10 carbon atoms, a group of the formula:

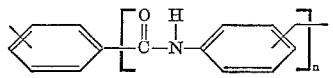

wherein $n$ is 1–6 or a perfluoroalkylene group containing up to about twelve carbon atoms; provided that when and only when $R^b$ and $R^c$ are Y, $R^a$ is

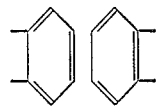

A preferred group of bis-anthranyls in which $R^a$ is

can also be characterized as follows:

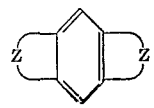

wherein Z is

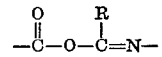

and each R is selected from the class consisting of aryl groups containing up to about 14 carbon atoms, alkyl groups containing up to about six carbon atoms and perfluoroalkyl groups containing up to about twelve carbon atoms.

Polyfunctional amines which are suitable for use in the present invention can be characterized generally as those organic amino compounds which contain at least 2 primary or secondary amino groups, and consequently contain a plurality of active amine-attached hydrogen atoms.

In the present invention, it has been found that the reactivity of a given polyfunctional amine toward the bis-anthranyls generally can be characterized in terms of a combination of the nature of the reactive amine groups present (i.e. whether aliphatic, aromatic or alicyclic, the aliphatic amines being much more strongly basic and reactive than the aromatic amines and the alicyclic amines being of intermediate basicity and reactivity), and the known to the art, be expressed as the amine valve. The amine value is defined as the number of milligrams of concentration of the amine groups, which may, as potassium hydroxide equivalent to the base content of 1 gram of polyamine as determined by titration with hydrochloric acid. In the present case, this is the amount of potassium hydroxide equivalent to the free amine groups present in one gram of amine. Preferably, the amine value of the reactant is at least about 50, while the maximum value is effectively determined by the ratio of amine groups to carbon or other atoms in the molecule, and as a practical matter structural limitation make the upper limits of the range about 1900. (Ethylene diamine, for example, has the amine value of about 1865.)

In addition to the factors noted, the reactivity of any copolymer system of the invention depends upon such other factors as the physical state (solid or liquid) of the constitutents, their viscosities, the presence of additives such as solvents, fillers, other resins, etc. The effect of these factors is similar to what is observed in polymer systems known to the art.

It is ordinarily preferred to use approximately stoichiometric proportions of the polyfunctional amine and bis-anthranyl comonomers in preparing the copolymers of the invention, although the system is rather insensitive to departure from stoichiometric amouns. Maximum tensile properties are ordinarily achieved with stoichiometric equivalents, while more flexible, more slowly curing copolymers are usually obtained when an excess of the polyfunctional amine is added. An excess of the bis-anthranyl constituent also results in a more slowly curing copolymer having a lower tensile strength. In particular product applications it may be desirable to depart from stoichiometrically equivalent amounts and such departures are contemplated in the present invention.

Among the aliphatic polyfunctional amines useful as comonomers in the present invention ar the polyalkylene polyamines such as ethylene diamine, diethylene triamine, triethylene tetramine, tetraethylene pentamine, trimethylene diamine, tetramethylene diamine, pentamethylene diamine, hexamethylene diamine, asymmetrical N-dimethyl propylene diamine, 1,3-pentamethyl diethylene triamine and asymmetrical N-diethyl propylene diamine, 1,3; ethylene oxide-amine adducts such as monohydroxy diethylene triamine and bis-hydroxyethyl diethylene triamine; propylene oxide-amine adducts such as N-(2-hydroxypropyl) ethylene diamine; etc. These compounds are generally highly reactive toward the polyanthranyl since they are aliphatic amines having relatively high amine values, e.g. the amine value of ethylene diamine is 1865, of diethylene triamine is 1630, of triethylene tetramine is 1540, etc. It is in fact sometimes necessary to modify their reactivity in order to avoid too rapid reaction with certain of the polyanthranyls. Such modification can be accomplished in a variety of ways, such as, for example, bringing the reactants together in a solvent system, using fillers with the system, preventing the build-up of heat by increasing the surface-to-volume ratio immediately after mixing the constituents and before substantial interreaction has taken place, for example, by coating the newly formed mixture as a thin film, and the like.

Differing from the polyalkylene polyamines, for the purposes of the present invention, primarily in that they have generally lower amine values, are the various polyfunctional aliphatic amines which are derived from low polymers of unsaturated fatty acids. It appears that polymerization of the unsaturated fatty acids takes place by inter-molecular condensation at the double bonds. The resulting low polymers generally comprise dimers and trimers, although tetramers or higher polymers can also be formed. Although these polymers have extremely complex structures which are not known with particularity, postulated structures of the dimer and the trimer of linoleic acid, which indicate possible structures of these low polymers in general, are as follows:

$$CH_3(CH_2)_5-CH-CH-CH=CH(CH_2)_7CO_2H$$
$$CH_3(CH_2)_5-CH \quad CH-(CH_2)_7CO_2H$$
$$CH=CH$$

$$CH_3(CH_2)_5-CH-CH-CH=CH(CH_2)_7CO_2H$$
$$CH_3(CH_2)_5-CH \quad CH-(CH_2)_7CO_2H$$
$$CH-CH$$
$$CH_3(CH_2)_5-CH \quad CH-(CH_2)_7CO_2H$$
$$CH=CH$$

The preparation of such polymeric polyene fatty acids is described in United States Patents 2,482,761, 2,373,015 and 2,435,478.

The low molecular weight polymers of polyene fatty acids can be reacted with polyfunctional amines to form higher molecular weight materials which contain aliphatic amine and amide functional groups. A postulated structure for a product of this type (the reaction product of the dimer of linoleic acid and ethylene diamine) is as follows

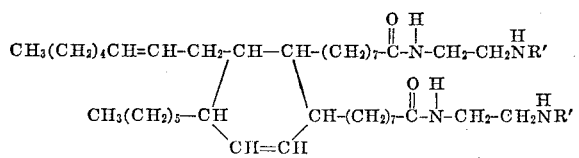

wherein R' is hydrogen or another linoleic acid dimer group. When a dimer of a fatty acid, e.g. of linoleic acid is condensed with a diamine, solid, thermoplastic materials usually result while if a polyamine is used in place of the diamine soft or liquid materials usually result. Resins of this general type are disclosed in U.S. Patent 2,450,940. Amine-terminated polyamides of this type, which will sometimes be referred to hereinafter for convenience simply as polyfunctional amines, are available from General Mills, Inc. of Kankakee, Illinois under the registered trade mark "Versamid." Among these products, which are produced by the condensation of polycarboxylic acids with polyamines, are "Versamid" 100, a soft, tacky resin that is semisolid at room temperature, which melts at 43–53° C. and which has an amine value of 83–93; "Versamid" 115, a viscous liquid resin at room temperature which has a viscosity at 40° C. of approximately 500–750 poises (on a Brookfield Viscometer using a No. 6 Spindle and revolving at 4 r.p.m.) and an amine value of 210–230; "Versamid" 125, a fluid resin at room temperature which is reported to have a viscosity at 40° C. of approximately 80–120 poises (on a Brookfield Viscometer using a No. 6 Spindle and revolving at 4 r.p.m.) and an amine value of 290–320; and "Versamid" XD–140, derived dimeric polyene higher fatty acids of the type described hereinabove, which is a liquid at room temperature which has a viscosity at 25° C. of approximately 130±30 poises (on a Brookfield Viscometer using a No. 6 Spindle and revolving at 4 r.p.m.) and an amine value of approximately 325–360.

Aliphatic polyfunctional amines which contain no amide groups may be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

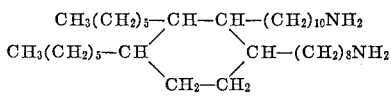

Polyfunctional amines of this type, which can be obtained from Emery Industries, Inc. of Cincinnati, Ohio are "Emery 3154-R" amine, a liquid resin at room temperature which has an amine value of approximately 177; and "Emery 654–27R" amine, which is also liquid at room temperature and which has an amine value of approximately 155. These and the above amide group-containing polyfunctional amines can be designated generically as polyfunctional amines derived from low polymers of higher fatty acids.

The easily available aliphatic polyfunctional amines which contain relatively low concentrations of amine functional groups, e.g., the "Versamid" and "Emery Amine" products which are substantially liquid, that is, liquid or semi-solid at ordinary temperatures lend themselves more easily to mixing with the polyfunctional anthranyls. Mixtures of the fatty acid amine polymers may be used if properties intermediate of two of them are desired, and in fact the commercially available products are themselves mixtures and commonly contain an amount of unpolymerized material, but this does not destroy their utility for use in the present invention.

Among the aromatic polyfunctional amines which are useful in preparing the copolymers of the invention are methylene-bis-o-chloroaniline (amine value 420); 4,4'-diamino diphenyl-sulfone (amine value 450); 4-isopropyl-m-phenylene-diamine (amine value 740); m-phenylene diamine (amine value 1004); and the liquid eutectic mixture of m-phenylene diamine with 4-isopropyl-m-phenylene diamine (available commercially from the E. I. Dupont Company, amine value approximately 800–900); as well as 4,4'-methylene dianiline; 2,6-diamino pyridine;

4-chloro-o-phenylene diamine; N-(2-aminoethyl) pyridine, etc.

In addition the alicyclic polyfunctional amines, such as menthane diamine and araliphatic polyfunctional amines such as m-xylylene diamine, are also useful in preparing the copolymers of the invention.

Among the polyfunctional anthranyls which are suitable for use in the present invention are:

Oxaloyl-bis-anthranyl; malonoyl-bis-anthranyl;
Adipoyl-bis-anthranyl; terephthaloyl-bis-anthranyl;
Bis-o-terephthalamido-benzoylanthranyl;
o-(p-Anthranylobenzamido) benzoylanthranyl;
Methylene-bis-acetylanthranyl;
Methylene-bis-benzoylanthranyl;
Dimethyl-diacetylanthranyl-methane;
Bis-benzoylanthranyl ether; bis-acetylanthranyl ether;
Bis-acetylanthranyl sulfone;
Benz bis-acetylanthranyl; benz bis-benzoylanthranyl;
Bis-o-(o-terephthalamido) benzamido benzoyl anthranyl;
Perfluoroadipoyl-bis-anthranyl; and
Benz-bis-perfluorooctanoylanthranyl.

The preparations of all or nearly all of these compounds, which are illustrative only, are given hereinafter. Many other polyfunctional anthranyls which are similar to these compounds can be prepared using analogous processes.

The reactive groups in the polyanthranyls with regard to polymerization with the amines are the heterocyclic rings of the formula:

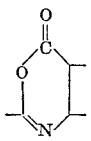

The reaction of the individual heterocyclic ring with the individual amine group of the polyamine can be represented as follows:

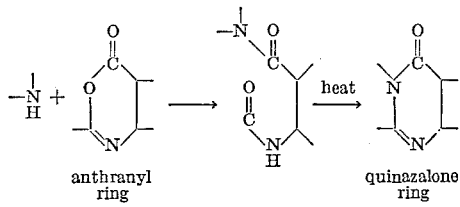

Thus a reaction product of a bis anthranyl with a compound which is bifunctional with respect to amine groups which contain active hydrogen (i.e., either primary or secondary amine groups) is a linear copolymer. If either comonomer contains more than two functions of these respective types, cross linking will be introduced.

The copolymers of the invention form valuable protective coatings for materials of construction such as, for example, wood, glass and metals. They are generally strongly adherent to such surfaces and are inert with respect to them. They can, in many cases, be applied as coatings without solvents from 100 percent solid-forming liquid systems when heated above about 200° C. and can also be applied from solutions of organic solvents, such as pyridine, quinoline and the like. When cured, they form clear, tough, transparent or translucent coatings. When post cured at higher temperatures, e.g., at 250–350° C., they form the quinazolone linkages which impart additional thermal oxidative stability. These coatings also retain desirable mechanical and chemical properties at relatively high temperatures. In addition to their use as protective coatings, the copolymers of the invention can be molded into articles which are stable at elevated temperatures. The use of high pressures in molding enables the use of somewhat lower temperatures, for example, they can be molded at about 150° C. at 10,000 p.s.i. The solid polymers may also be fabricated in structures of various kinds by sawing, filing, carving and the like.

In order more clearly to disclose the preparation of the intermediate polyanthranyl compounds and the copolymers of the invention, specific examples of preparation of a number of them will now be described. All parts are given by weight unless otherwise designated.

EXAMPLE 1

Prepaartion of adipyl-bis-anthranyl

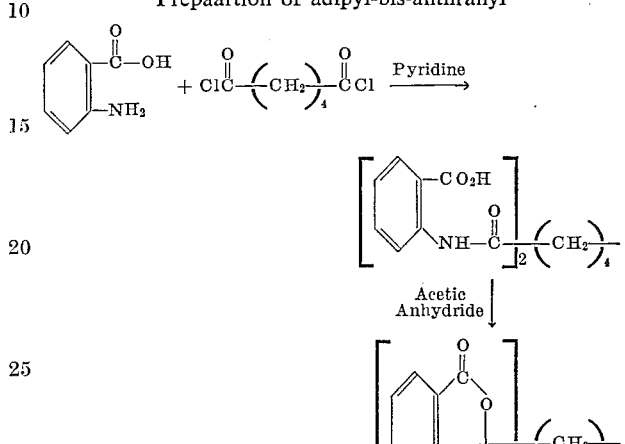

Adipyl chloride (one mole) is dissolved in 200 cc. of pyridine and added dropwise to anthranilic acid (2 moles) dissolved in 500 cc. of pyridine and chilled in an ice bath. A greenish-yellow solid precipitates from solution and is separated by filtration, washed and dried. This product is dissolved in warm dilute aqueous NaOH and reprecipitated by acidification of the solution with dilute aqueous HCl. The resulting dibasic acid (M.P. 213–215°) is isolated as a white powder in 59% of the theoretical yield. The anticipated structure of adipyl dianthranilic acid is verified by its infrared spectrum and by elementary analysis.

Calc'd for $C_{20}H_{20}O_6N_2$: C, 62.4; H, 5.2; N, 7.3; O. 25.1. Found: C, 62.4; H, 5.6; N, 7.5; O, 24.5 (by difference).

Adipyl dianthranilic acid (0.5 mole) is allowed to react overnight at reflux temperature in acetic anhydride and adipoyl bis-anthranyl is obtained almost quantitatively as a brown solid (M.P. 210–220°). This product is insoluble in cold acetic anhydride and is separated easily by filtration.

EXAMPLE 2

Preparation of terephthaloyl-bis-anthranyl

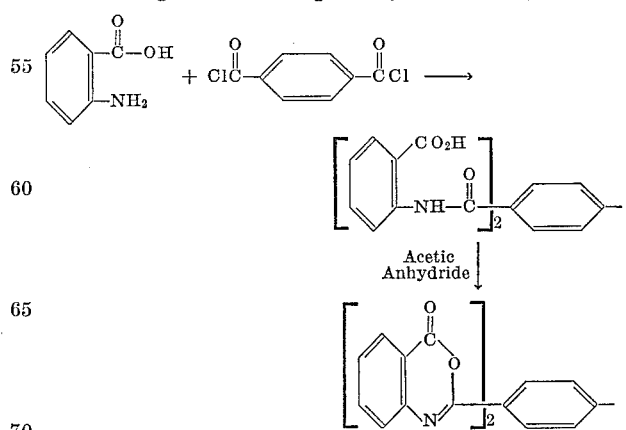

A slurry of 40 g. (0.2 mole) terephthaloyl chloride and 108 g. (0.8 mole) anthranilic acid in 500 ml. benzene is stirred vigorously and heated to reflux temperature and gentle refluxing is continued for 15 minutes. The mixture is then filtered and the resulting solid is treated with 2100 ml. of 5% sodium bicarbonate to neutralize excess acids and digested on the steam bath for 2 hours. The complex salt of terephthaloyl-bis-anthranilic acid is collected by suction filtration (slow) and the moist filter cake is treated with 1 liter acetic acid at reflux for 1 hour to regenerate the bis acid. The insoluble acid is collected and treated with 500 ml. of acetic anhydride at reflux overnight. The insoluble bis-anthranyl is collected by gravity filtration of the boiling mixture and treated with an additional 500 ml. boiling acetic anhydride. The mixture is cooled and filtered, 57 g. of a yellow powder, M.P. 316–319° C. being collected. The infrared spectrum and elementary analysis are consistent with the structure of terephthaloyl-bis-anthranyl.

Calc'd for $C_{22}H_{12}N_2O_4$: C, 71.73; H, 3.29; N, 7.61; N.E. 184. Found: C, 71.5; H, 3.3; N, 7.6; N.E., 185.

This bis-anthranyl is sparingly soluble in boiling pyridine and can be crystallized from this solvent to shiny yellow platelets (M.P. 315–317° C.) which have the same elementary analysis as the foregoing product.

Perfluoroadipyl-bis-anthranyl is prepared by an analogous sequence in which anthranilic acid is reacted with perfluoroadipyl chloride in pyridine at 0°. The resulting bis-diamidodicarboxylic acid is ring-closed by reaction with acetic anhydride to give the desired anthranyl.

EXAMPLE 3

Preparation of terephthalamido bis(o-benzoylanthranyl)

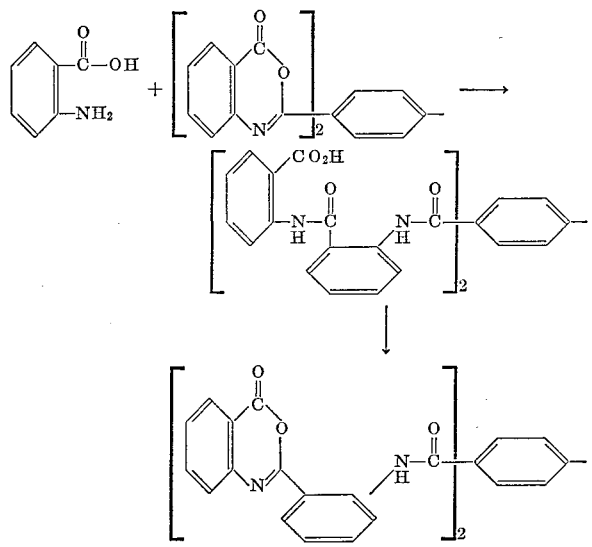

A mixture of 10 g. (0.027 ml.) of terephthaloyl-bis-anthranyl and an excess of anthranilic acid (12 g. 0.088 m.) in 200 ml. pyridine is heated at reflux for four days to give a homogeneous solution. At the end of that time the mixture is allowed to cool to room temperature. A solid slowly separates from the cold solution during the next 24 hours. The solid is collected and leached with 1 liter of boiling acetic acid. About 4 grams of the product (bis-o-(o-terephthalamido)benzamidobenzoic acid is recovered by filtration of the boiling mixture in the form of a colorless powder, M.P. 253–254. The infrared spectrum and elementary analysis of this product are consistent with the assigned structure.

Calc'd for $C_{36}H_{26}N_4O_8$: C, 67.29; H, 4.08; N, 8.72; N.E. 321. Found: C, 65.4; H, 4.1; N, 8.5; N.E. 333.

A mixture of 3 g. of bis-o-(o-terephthalamido)benzamidobenzoic acid in 50 ml. of acetic anhydride is maintained at reflux overnight. Complete solution is not effected. The product is recovered from the cold mixture, washed with benzene, and dried. The white, granular powder (2.8 g.) melts at 362–363° C.

The infrared spectrum and elementary analysis of this product are consistent with the assigned structure.

Calc'd for $C_{36}H_{22}N_4O_6$: C, 71.28; H, 3.66; N, 9.24; N.E. 303. Found: C, 70.8; H, 3.6; N, 9.2; N.E. 290.

EXAMPLE 4

Preparation of o-(p-anthranylobenzamido) benzoylanthranyl

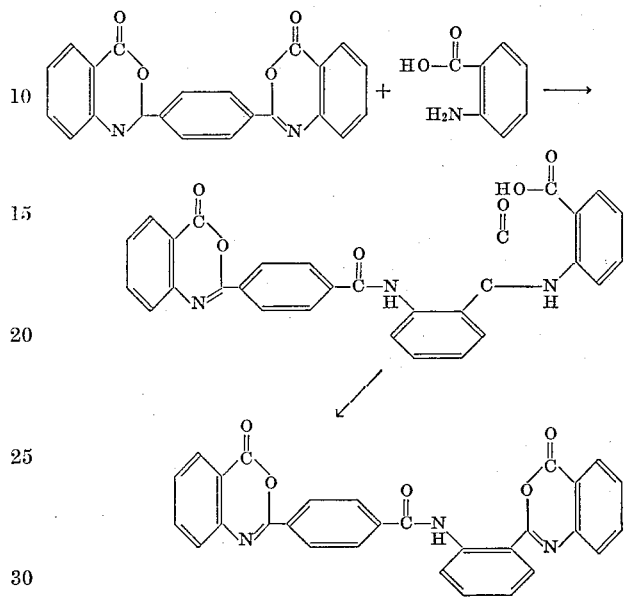

Anthanilic acid (6 g., 0.044 m.) and terephthaloyl-bis-anthranyl (5 g., 0.014 m.) are allowed to react 2.5 days in 200 ml. of acetic acid at reflux. The solid recovered from the cold mixture is recrystallized from pyridine and the product dried in vacuo at 125° C. There is recovered 1.5 g. o- o-(p-anthranylobenzamido)-benzamidobenzoic acid as a hard, granular powder, M.P. 289–293.

The infrared spectrum and elementary analysis of this product are consistent with the assigned structure.

Calc'd for $C_{29}H_{19}N_3O_6$: C, 68.9; H, 3.80; N, 8.31; N.E. 252. Found: C, 68.8; H, 4.0; N, 8.5; N.E. 252.

The crude anthranylobenzoic acid prepared according to the above procedure is treated with 500 ml. of boiling acetic anhydride for 20 hours. From the cold mixture is recovered 6 g. of crude o-(p-anthranylobenzamido)-benzoylanthranyl, M.P. 280–284° C. Purification by recrystallization from CHCl$_3$ gives 3 g. of the product in the form of long, tough, wiry, colorless crystals, M.P. 292° C.

The infrared spectrum and elementary analysis of this product are consistent with the assigned structure.

Calc'd for $C_{29}H_{17}N_3O_5$: C, 71.46; H, 3.51; N, 8.62; N.E. 244. Found: C, 70.2; H, 3.8; N, 8.2; N.E. 244.

EXAMPLE 5

Preparation of methylene-bis-acetylanthranyl

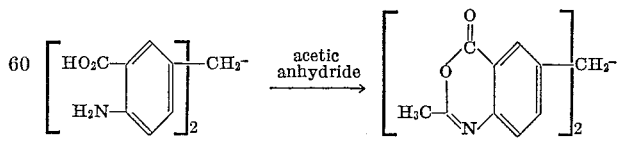

Powdered di-(4-amiophenyl)methane-3,3'-dicarboxylic acid (129 g., 0.33 mole) is added slowly to hot acetic anhydride (1 lb.) at a rate just fast enough to maintain the mixture at reflux temperature. The compound dissolves as quickly as it is added and the product precipitates during the addition which requires about 20 minutes. The mixture is digested at reflux temperature for an additional half hour and is then chilled to room temperature and separated by filtration. The filter cake is washed with hexane and then with diethyl ether to give the product as tiny flakes (74 g., M.P. 264–268°). The acetic anhydride mother liquor is concentrated to ⅓ its volume by distillation and an additional 17 g. of product (M.P. 260–265°) is recovered when the solution is chilled to room temperature. The products are recrystallized from pyridine to give tiny light-amber platelets (M.P. 269–271°).

Calc'd for $C_{19}H_{14}O_4N_2$: C, 68.25; H, 4.19; N, 8.38; Mol. Wt. 334.3. Found: C, 68.2; H, 4.2; N, 8.5.

The infrared spectrum of this product is consistent with the proposed structure.

EXAMPLE 6

Preparation of methylene-bis-benzoylanthranyl

Benzoyl chloride (122 g.) is added dorpwise to a solution of impure di-(4-aminophenyl) methane-3,3'-dicarboxylic acid (M.P. 225–230°; 62 g.) in pyridine (1 l.) cooled in an ice bath. A precipitate separates during the addition which requires about 30 minutes. The mixture is separated by filtration, washed sequentially with water, aqueous sodium bicarbonate and again with water. The dry filter cake (60 g.) (M.P. 291–294°) is recrystallized from pyridine to give methylene - bis - benzoylanthranyl in the form of white crystals (M.P. 297–298°; 20 g.).

The infrared spectrum is consistent with the expected compound.

Calc'd for $C_{29}H_{18}O_4N_2$: C, 75.97; H, 3.96; N, 6.11; M.W. 458.48. Found: C, 75.4; H, 4.0; N, 6.3.

EXAMPLE 7

Preparation of bis-acetylanthranyl sulfone

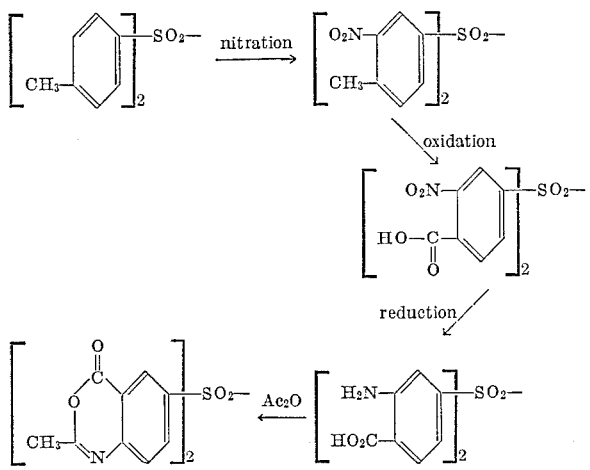

About 238 cc. (density 1.5) of nitric acid are added dropwise over a period of 1.5 hours to a well stirred solution of 95 grams of p-toluene solfone in 238 cc. of sulfuric acid (density 1.83), the reaction mixture being kept at about 0° C. The mixture is stirred for an additional one half hour and then poured onto chipped ice and separated by filtration. The resulting precipitate is washed with water and recrystallized from acetic acid to produce 3,3'-dinitrodi-p-tolysulfone in the form of yellowish platelets melting at 160–161°C. The infrared spectrum of this product is consistent with the anticipated structure.

Four grams of the dinitrosulfone is dissolved by stirring into 50 cc. concentrated sulfuric acid at room temperature. The solution is chilled in an ice bath and six grams of chromium trioxide is added in small portions over a period of one hour with stirring. Stirring is maintained for one hour after which the reaction mixture is poured onto 500 grams of chipped ice. The gummy red-brown solid is separated by suction filtration and recrystallized first from water and then twice from acetic acid. There is recovered 3,3'-dinitrodiphenylsulfone-4,4'-dicarboxylic acid as a one-to-one complex with acetic acid in the form of red blades which melt at 284–287° with decomposition. The infrared spectrum, elementary analyses, and neutral equivalent are consistent with the indicated structure.

Calc'd for $C_{16}H_{12}N_2SO_{12}$: C, 42.11%; H, 2.65%; N, 6.14%; S, 7.03%; N.E. 456, 228, 152. Found: C, 42.6%; H, 2.8%; N, 6.2%; S, 7.2%; N.E. 472, 240, 150.

The dinitrodiphenylsulfonedicarboxylic acid (2.6 grams) is mixed with 25 ml. ethyl alcohol and one-half gram Raney nickel catalyst in a 40 ml. autoclave. Reduction is accomplished by holding the mixture at 60° under 600 p.s.i. of hydrogen pressure for twenty hours. The reaction mixture is separated by filtration and the filtrate evaporated to dryness. Recrystallization of the residue from isopropyl alcohol-water gives 3,3'-diaminodiphenylsulfone-4,4'-dicarboxylic acid as a tan powder which decomposes at 236–240°. The infrared spectrum is consistent with the expected structure.

A solution of 1.4 grams of 3,3'-diaminodiphenylsulfone-4,4'-dicarboxylic acid in 50 cc. acetic anhydride is refluxed overnight. Most of the solvent is removed by distillation and the concentrated solution evaporated to dryness. The resulting beige powder is recrystallized from toluene to give the desired bis-acetylanthranyl sulfone in the form of colorless crystals which melt at 297–298° with decomposition. The infrared spectrum is consistent with the anticipated structure. The material is converted to the corresponding diacetamidodicarboxylic acid either during standing in moist air or by treatment with water containing acid or alkali.

Similarly, the bis-anthranyl

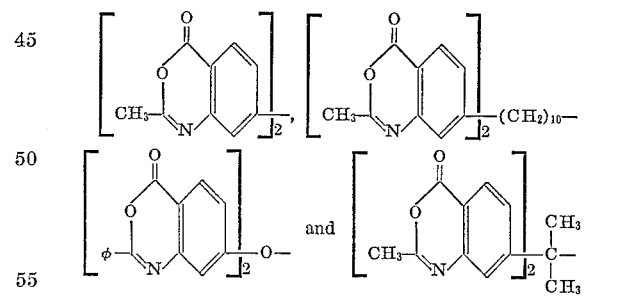

are prepared from p-ditolyl; 1,10-di-(p-tolyl)decane; p-tolyl ether; and 2,2-di-(p-tolyl)propane, respectively.

EXAMPLE 8

Preparation of benz bis-acetylanthranyl

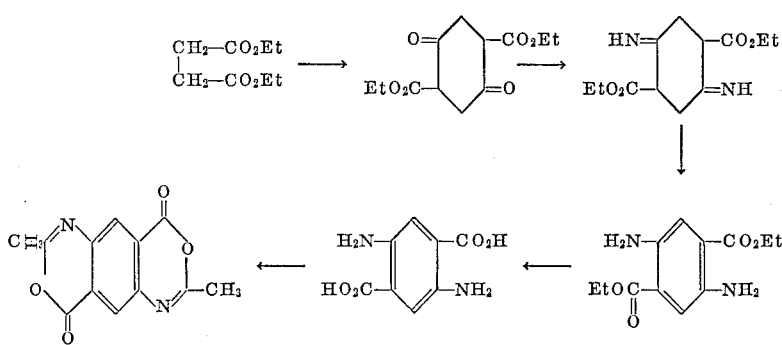

Diethyl succinate (348 g.; 2 moles) and sodium ethylate (156 g.; 2 moles) are allowed to react at 80–85° for about 16 hours. After the reaction mixture is cooled to room temperature, it solidifies to a solid mass that is powdered by means of a mortar and pestle. The powder is washed with ether, dilute aqueous $H_2SO_4$ and water. The residue is recrystalized from ethyl alcohol and diethyl succinylsuccinate is obtained in the form of yellow needles (67 g.; 65% yield; M.P. 116–120°). The infrared spectrum is consistent with the assigned configuration.

A sample of diethyle succinylsuccinate (10 g.) is fused over an open flame with anhydrous ammonium acetate (50 g.) to give a clear yellow melt which solidifies to a solid mess when cooled to room temperature. The mass is ground to a powder and leached with cold water. The residue is impure diethyl succinylsuccinate diimine, in the form of a pale yellow powder (10 g., M.P. 161–162°). The infrared spectrum is consistent with the assigned configuration.

The diimine (10 g.) is dissolved in concentrated $H_2SO_4$ (200 g.). Bromine (20 g.) is added and the two-phase mixture is allowed to react at 45–50° for 1½ hours. The acid solution is decanted from the excess bromine. The bromine, dissolved in the $H_2SO_4$ layer is eluted by a stream of nitrogen. The bromine-free acid solution is then poured into a 1 l. beaker filled with ice chips. The mixture is allowed to melt for 1 hour and is then filtered. The insoluble sulfate salt of the diaminodiester is suspended in water (1 l.) saturated with sodium acetate and the free base is obtained as an orange yellow powder (M.P. 163–166°). The diester is saponified with hot aqueous 10% NaOH. Addition of glacial acetic acid to the chilled saponification mixture gives p-diamino terephthalic acid in the form of fine yellow green crystals that do not melt below 400°. The infrared spectrum is consistent with the assigned configuration but indicates that some of the acid is present as the sodium salt. The crude material is reacted with acetic anhydride (200 cc.) for five days at reflux temperature to form benz bis-acetylanthranyl which crystallizes in the form of pale yellow flakes (M.P. 322–324°).

The infrared spectrum is consitent with the assigned configuration.

Calc'd for $C_{12}H_8N_2O_4$: C, 59.02; H, 3.30; N, 11.47; M.W. 244.2. Found: C, 58.8; H, 3.5; N, 11.6.

Alternatively the p-diaminoterephthalic acid can be converted to the corresponding benz-bis - perfluoroöctanoylanthranyl by reaction with excess perfluoroöctanoyl chloride in pyridine at 0°.

EXAMPLE 9

Copolymers of methylene-bis-acetylanthranyl and hexamethylene diamine

Methylene - bis - acetylanthranyl (6.6867 grams, 0.02 mole) and hexamethylene diamine (2.3242 grams, 0.02 mole) are added to 150 cc. of diphenylether in a 250 cc. Erlenmeyer flask, the mixture is allowed to react at 230° C. for 2 hours and is cooled to room temperature and diluted with methanol. The insoluble polymer is separated by filtration, digested in fresh methanol and again collected by filtration. Approximately ⅔ of this product is then fused at 300° C. under nitrogen. Long filaments are drawn from this copolymer which solidify at room temperature and attain relatively high strength.

In a second preparation, 3.3434 grams (0.01 mole) of methylene - bis - acetylanthranyl and 1.1622 grams (0.01 mole) of hexamethylene diamine are reacted together in the presence of 150 cc. of pyridine for 24 hours at 60–70° C. The polymer is recovered by slow addition of the resulting solution to a large excess of water after which it is collected by filtration and heated until liquid. Copper and tin test pieces are dipped in the fused copolymer and, when they have cooled to room temperature, are found to be covered by a tough, adherent surface coating. A similar copolymer of hexamethylene diamine and methylene - bis - acetylanthranyl copolymerized at 80° C. in the presence of dimethylformamide is found to have a melting point of greater than 335° C.

In still another preparation, 5.7203 grams (0.0201 mole) of methylene-bis-acetylanthranyl are dissolved in 150 cc. of hot pyridine and 2.325 grams (0.0201 mole) of hexamethylene diamine dissolved in 25 cc. of pyridine are added. The reaction mixture is maintained hot for ½ hour and then cooled to room temperature. Glass and aluminum test pieces are coated by dipping them in the pyridine solution of the copolymer to form strongly adherent protective films thereon. This copolymer is found to soften at 190° C.

EXAMPLE 10

Copolymers of methylene-bis-acetylanthranyl and 4,4'-diaminodiphenylether

Methylene-bis-acetylanthranyl (3.3434 grams, 0.01 mole) and 4,4'-diaminodiphenylether (2.0024 grams, 0.01 mole) are mixed together with 150 cc. of pyridine in a 250 cc. Erlenmeyer flask. The mixture is allowed to react for 4 days at 70° C. with continuous stirring in an atmosphere of hydrogen. At the end of this time the resulting polymeric solution is added slowly to a large excess of water and 4 grams of polymer is isolated by filtration. The melting point of this polymer is above 335° C. and it has an intrinsic viscosity (as measured from a 1 percent solution in dimethylformamide) of 0.051.

EXAMPLE 11

Copolymers of methylene-bis-benzoylanthranyl and hexamethylenediamine

Methylene-bis-benzoylanthranyl (3.5 g.) is added in about 0.4 g. increments every five minutes to a warm solution of hexamethylenediamine (0.7 g.) and pyridine (10 cc.). A homogeneous solution is obtained within 3 minutes of each addition until a stoichiometric amount is reacted; thereafter the excess methylene-bis-benzoylanthranyl remains insoluble. The viscous solution is diluted with pyridine (50 cc.) and added dropwise with vigorous stirring to water (500 cc.). The product is separated by filtration and isolated as a white powder (4.0 g.; softening point 200–220°). The infrared spectrum of the product is consistent with the all amide copolymer. The inherent viscosity of this polymer is 0.225. Strong glass laminates are prepared on a Fischer-Johns hot stage using 1 mm. thick watch glasses. Solutions of the polymer in pyridine are used to dip coat aluminum strips and copper wires. Tough transparent films are cast from this solution.

EXAMPLE 12

Copolymers of terephthaloyl-bis-anthranyl and hexamethylenediamine

Hexamethylenediamine is purified by distillation under $N_2$ into a tared vial (1.501 g., 0.0129 m.). This material in 100 ml. pyridine is treated with 4.75 g. (0.0129 m.) of terephthaloyl-bis-anthanyl in portions over a period of 2 hours. The mixture is maintained at 95° C. and is blanketed with $N_2$. The anthanyl dissolves rapidly on each addition until about three-fourths has been added. At that time solid begins to separate from solution. Heating of the heterogeneous mixture is maintained four days. The product is recovered by quenching the reaction mixture in 1 l. of water, washing and drying it in vacuo at 50° C. The granular white solid weighs 5.7 g. (91% yield) and melts to a black liquid at 280–310° C. The polymer is only sparingly soluble in boiling dimethyl sulfoxide, dimethyl formamide, and m-cresol but is freely soluble in cold $CF_3COOH$. Its inherent viscosity in $CF_3COOH$ is 0.166. The infrared spectrum is consistent with the expected structure.

EXAMPLE 13

Additional copolymers according to the invention can be prepared by reacting approximately equimolar amounts of the following bis anthranyls and polyfunctional amines in pyridine solution at increased temperatures:

| Lot | Bis Anthranyl | Polyfunctional Amine |
|---|---|---|
| A | Oxaloyl-bis-anthranyl | "Versamid 115". |
| B | Malonoyl-bis-anthranyl | "Emery 3154-R". |
| C | Adipoyl-bis-anthranyl | Methylene-bis-o-chloroaniline. |
| D | Terephthaloyl-bis-anthranyl | 4,4'-methylene dianiline. |
| E | Bis-o-terephthalamido-benzoylanthranyl | Triethylene tetramine. |
| F | O-(p-anthranylobenzamido)benzoylanthranyl | Ethylene diamine. |
| G | Dimethyl-diacetylanthranyl methane | 4,4'-methylene dianiline. |
| H | Bis-benzoylanthranyl ether | m-Xylene diamine. |
| I | Bis-acetylanthranyl sulfone | Hexamethylene diamine. |
| J | Benz-bis-acetylanthranyl | m-Phenylene diamine. |
| K | Methylene-bis-acetylanthranyl | "Versamid 100". |
| L | Perfluoroadipoyl-bis-anthranyl | Ethylene diamine. |
| M | Benz-bis-perfluorooctanoyl-anthranyl | Triethylene tetramine. |
| N | Bis-stearyl anthranyl | Hexamethylene diamine. |
| O | Bis-formyl anthranyl | Do. |
| P | Bis-1-naphthyl anthranyl | Do. |
| Q | Bis-2-anthroyl anthranyl | Do. |
| R | Naphthaloyl-bis-anthranyl | Do. |

Glass and/or metal test pieces can then be coated by dipping them in the copolymer solutions and heating to evaporate the solvent thereby forming strongly adherent protective coatings thereon. An additional heat cycle, e.g. at 250–350° C. will form the even stronger quinazalone linkages in the protective films.

What is claimed is:

1. A copolymer of a polyfunctional amine containing a plurality of active amine-attached hydrogen atoms with a bis-anthranyl having the formula:

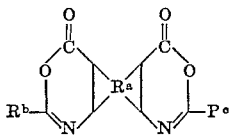

wherein $R^a$ is selected from the class consisting of:

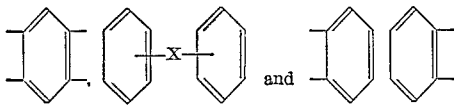

$R^b$ and $R^c$ are each selected from the class consisting of hydrogen, aryl groups containing up to about 14 carbon atoms, alkyl groups containing up to about 18 carbon atoms and perfluoroalkyl groups containing up to about 12 carbon atoms and $R^b$ and $R^c$ when taken together are Y; X is a carbon-carbon single bond or a member selected from the class consisting of —O—, —SO$_2$— and alkylene groups containing 1–18 carbon atoms; Y is a carbon-carbon single bond or a member selected from the class consisting of alkylene groups containing up to about 18 carbon atoms, arylene groups containing up to about 10 carbon atoms, groups of the formula:

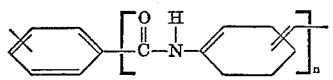

wherein $n$ is 1–6 and perfluoroalkylene groups containing up to about 12 carbon atoms; provided that when $R^b$ and $R^c$ are Y, $R^a$ is

 

2. A copolymer according to claim 1 wherein $R^a$ is

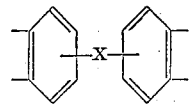

3. A copolymer according to claim 1 wherein $R^b$ and $R^c$ together are Y and $R^a$ is

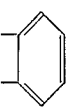 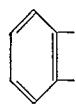

4. A copolymer according to claim 1 wherein the bis-anthranyl is methylene-bis-acetylanthranyl.

5. A copolymer according to claim 1 wherein the bis-anthranyl is methylene-bis-benzoylanthranyl.

6. A copolymer according to claim 1 wherein the bis-anthranyl is terephthaloyl-bis-anthranyl.

7. A copolymer according to claim 1 wherein the polyfunctional amine is hexamethylene diamine.

8. A copolymer according to claim 1 wherein the polyfunctional amine is 4,4'-diaminodiphenylether.

9. A polymer prepared by the reaction of a compound of the formula:

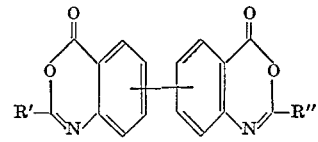

wherein R' and R" each represents alkyl containing up to 18 carbon atoms, with a diamine of the formula:

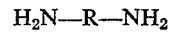

wherein R represents alkylene, arylene, methylenebiphenylene, pyridylene and oxybiphenylene.

10. A copolymer of a polyfunctional amine with a bis-anthranyl of the formula:

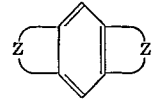

wherein Z is

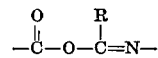

and each R is selected from the class consisting of aryl groups containing up to about 14 carbon atoms, alkyl groups containing up to about six carbon atoms and perfluoroalkyl groups containing up to about twelve carbon atoms.

11. A copolymer of methylene-bis-acetylanthranyl and hexamethylene diamine.

12. A copolymer of methylene-bis-acetylanthranyl and 4,4'-diaminodiphenylether.

13. A copolymer of methylene-bis-benzoyl-anthranyl and hexamethylenediamine.

14. A copolymer of terephthaloyl-bis-anthranyl and hexamethylenediamine.

References Cited

UNITED STATES PATENTS

| | | | |
|---|---|---|---|
| 2,356,516 | 8/1944 | Hagodorn | 260—78 |
| 2,688,011 | 8/1954 | Wheatley et al. | 260—78 |

GEORGE F. LESMES, *Primary Examiner.*

W. H. SHORT, S. H. BLECH, *Examiners.*

H. D. ANDERSON, *Assistant Examiner.*

UNITED STATES PATENT OFFICE
CERTIFICATE OF CORRECTION

Patent No. 3,408,326                                                       October 29, 1968

Louis A. Errede

It is certified that error appears in the above identified patent and that said Letters Patent are hereby corrected as shown below:

Column 1, lines 17 to 22, the formula should appear as shown below:

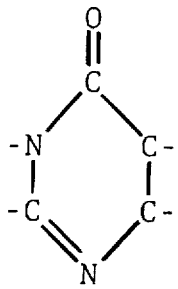

same column 1, line 42, "polymunctional" should read -- polyfunctional --. Column 2, line 43, after "and the" insert -- concentration of amine groups, which may, as --; line 44, "valve" should read -- value --; line 46, cancel "concentration of the amine groups, which may, as"; line 69, "amouns" should read -- amounts --. Column 8, lines 12 to 21, the right-hand portion of the formula should appear as shown below:

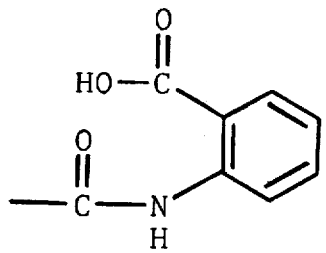

Column 9, line 58, "tolysulfone" should read -- tolylsulfone --. Columns 9 and 10, the formula should appear as shown below:

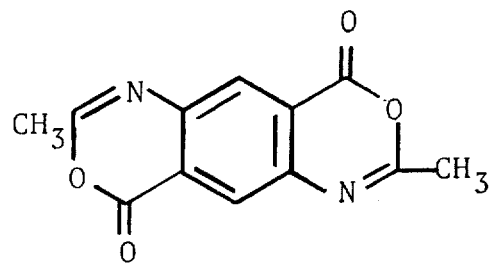

Column 11, line 15, "solid mess" should read -- solid mass --.
Column 13, lines 61 to 65, the formula should appear as shown below:

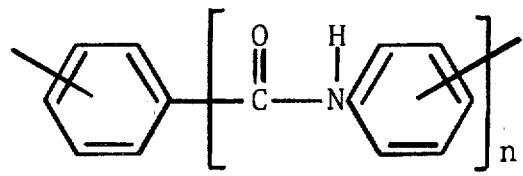

Signed and sealed this 14th day of April 1970.

(SEAL)
Attest:

EDWARD M. FLETCHER, JR.
Attesting Officer

WILLIAM E. SCHUYLER, JR.
Commissioner of Patents